US011294874B2

(12) United States Patent
Ikai

(10) Patent No.: US 11,294,874 B2
(45) Date of Patent: Apr. 5, 2022

(54) STRUCTURED RECORD RETRIEVAL

(71) Applicant: Ab Initio Technology LLC, Lexington, MA (US)

(72) Inventor: Taro Ikai, Singapore (SG)

(73) Assignee: Ab Initio Technology LLC, Lexington, MA (US)

( * ) Notice: Subject to any disclaimer, the term of this patent is extended or adjusted under 35 U.S.C. 154(b) by 64 days.

(21) Appl. No.: 16/521,934

(22) Filed: Jul. 25, 2019

(65) Prior Publication Data

US 2020/0034345 A1    Jan. 30, 2020

Related U.S. Application Data

(60) Provisional application No. 62/702,992, filed on Jul. 25, 2018.

(51) Int. Cl.
*G06F 16/22* (2019.01)
*G06F 16/81* (2019.01)
*G06F 16/835* (2019.01)
*G06F 16/245* (2019.01)

(52) U.S. Cl.
CPC ........ *G06F 16/2246* (2019.01); *G06F 16/245* (2019.01); *G06F 16/81* (2019.01); *G06F 16/835* (2019.01)

(58) Field of Classification Search
CPC .. G06F 16/2246; G06F 16/245; G06F 16/282; G06F 16/81; G06F 16/835; G06F 16/2228; G06F 16/2273
See application file for complete search history.

(56) References Cited

U.S. PATENT DOCUMENTS

| 5,657,437 | A | * | 8/1997 | Bishop | G06F 16/9027 |
| | | | | | 715/203 |
| 6,208,993 | B1 | * | 3/2001 | Shadmon | G06F 16/30 |
| 6,377,946 | B1 | * | 4/2002 | Okamoto | G06F 16/81 |
| 6,421,662 | B1 | | 7/2002 | Karten | |
| 6,728,732 | B1 | | 4/2004 | Eatherton et al. | |
| 7,634,498 | B2 | | 12/2009 | Pal et al. | |
| 2002/0010714 | A1 | | 1/2002 | Hetherington | |

(Continued)

OTHER PUBLICATIONS

GXS "EDIFACT Standards—Overview Tutorial—Learn About Key e-Commerce Trends and Technologies at Your Own Pace" [retrieved from the internet: https://www.gxs.co.uk/wp-content/uploads/tutorial_edifact.pdf].

(Continued)

*Primary Examiner* — James E Richardson
(74) *Attorney, Agent, or Firm* — Occhiuti & Rohlicek LLP

(57) ABSTRACT

An approach to structured record retrieval permits transmission and storage of records in a native concise format, without requiring that the records be interpreted and stored in a tabular form. Such storage of the records in a tabular form might double the space required, and more generally, requires substantially more space in applications in which there are many optional elements. In some embodiments, each message is parsed according to a specification of the message structure (e.g., according to a "grammar" for the message), and during parsing field values in predefined positions in the structure are extracted and added to an index structure that associates record identifiers with the (position, value) pairs.

20 Claims, 7 Drawing Sheets

(56) References Cited

U.S. PATENT DOCUMENTS

| | | | | |
|---|---|---|---|---|
| 2006/0184551 | A1* | 8/2006 | Tarachandani | G06F 16/8373 |
| 2010/0161623 | A1* | 6/2010 | Torbjornsen | G06F 16/319 |
| | | | | 707/754 |
| 2015/0278309 | A1 | 10/2015 | Harada et al. | |
| 2018/0024780 | A1* | 1/2018 | Yang | G06F 16/00 |
| | | | | 711/154 |
| 2020/0004876 | A1* | 1/2020 | Sinha | G06F 16/93 |

OTHER PUBLICATIONS

Catania et al., "XML Document Indexes: A Classification" IEEE Internet Computing (vol. 9 , Issue: 5 , Sep.-Oct. 2005, pp. 64-71).

Shimizu, Toshiyuki, "Full-Text and Structural Indexing of XML Documents on B+–Tree," IEICE Trans. Inf. & Syst., vol. E89-D, No. 1, pp. 237-247. 2006).

Dyrkell, Fredrik, "Parsing EDIFACT with Clojure's Instaparse" [retrieved from the Internet Jul. 25, 2019: http://www.lexicallyscoped.com/2015/07/27/parse-edifact-w-clojure-instaparse.html].

Grust, Torsten, "Accelerating XPath Location Steps," Proc. of the 28. Conference on Very Large Databases (VLDB), Hong Kong, China, Aug. 2002, 12 pages).

Arroyuelo et al., "Fast in-memory XPath search using compressed indexes," Software: Practice and Experience, Wiley, 2015, 45 (3), pp. 399-434.

Anonymous, "EDI Standards Overview—Structure of an EDIFACT file", Jul. 6, 2018 (XP055621843)[retrieved from the internet: https://ecosio.com/en/blog/2018/07/06/EDI-Standards-Overview-Structure-of-an-EDI-FACT-file/.

* cited by examiner

```
Reservation (group of segments)
|
|--Passenger (group of segments)
|   |
|   |--Name ("TIF" segment) Tuple: (1)
|   |   |
|   |   |--TRAVELLER SURNAME AND RELATED INFORMATION (Component type E985)  Tuple: (1,0)
|   |   |
|   |   |   |--Family name (Element type 3500)  Tuple: (1,0,0)
|   |   |   |...(abbreviated)          Tuple: (1,0,1)
|   |
|   |--Address ("ADR" segment) Tuple: (2)
|   |   |
|   |   |--ADDRESS USAGE (Component type C817)    Tuple: (2,0)
|   |   |   |
|   |   |   |--Address purpose code   (Element type 3299)  Tuple: (2,0,0)
|   |   |   |...(abbreviated)          Tuple: (2,0,1)
|   |   |
|   |   |--ADDRESS DETAILS (Component type C090)  Tuple: (2,1)
|   |   |   |
|   |   |   |--Address format code    (Element type 3477)        Tuple: (2,1,0)
|   |   |   |--Address component description   (Element type 3286)
|   |   |   |  This is where the first line of street address is stored.    Tuple: (2,1,1)
|   |   |   |--...(abbreviated)                 Tuple: (2,1,2)
|   |   |
|   |   |--...(abbreviated)           Tuple: (2,2)
|
|--Agent (group of segments)
    |
    |--Address ("ADR" segment)   Tuple: (3)
        |
        |-- ADDRESS USAGE  (Component type C817)  Tuple: (3,0)
        |   |
        |   |--Address purpose code   (Element type 3299)  Tuple: (3,0,0)
        |   |--..(abbreviated)          Tuple: (3,0,1)
        |
        |--ADDRESS DETAILS (Component type C090)    Tuple: (3,1)
        |   |
        |   |--Address format code    (Element type 3477         Tuple: (3,1,0)
        |   |--Address component description   (Element type 3286).
        |   |  This is where the first line of street address is stored.    Tuple: (3,1,1)
        |   |--...(abbreviated)
        |
        |--...(abbreviated)          Tuple: (3,2)
```

FIG. 7

STRUCTURED RECORD RETRIEVAL

CROSS-REFERENCE TO RELATED APPLICATIONS

This application claims the benefit of U.S. Provisional Application No. 62/702,992, filed on Jul. 25, 2018, which is incorporated herein by reference.

BACKGROUND

This description relates to retrieval of structured records, and more particularly relates to indexing of records with hierarchical structure of optional parts, and retrieval of such records based on the indexing.

In some applications, records are formatted in a manner that may be motivated by providing a concise form for transmission or storage. In some examples, the standards for such messages may have been established many years ago and may be entrenched in an industry practice. One example of such a concise form is defined by the Electronic Data Interchange for Administration, Commerce and Transport (EDIFACT), the syntax of which is defined in an international standard ISO 9735 (1988). An example of an industry with entrenched use of this standard is in the Airline industry, which uses the EDIFACT syntax for transmission and storage or reservation-related data.

Each EDIFACT record is referred to as a "message." Messages are, in general, made up of a collection of sequenced segments within defined parts of a message. Some segments may be used in more than one part of a message. The segments that may (conditional) or must (mandatory) be used in each part, and the number of permitted repetitions of a segment, are defined for a particular application. In some applications, collections of segments repeat as a group, and are referred to as groups. Segments and/or groups may be nested. Each segment is named (where the EDIFACT segment names are three alphanumeric characters). Each segment has one or more elements, which may be simple elements with a single value, or which may be composite elements. A composite element consists of two or more delimited values. Elements within a segment and within a composite are explicitly delimited (e.g., with separate delimited characters (e.g., "+" and ":"), and each segment is explicitly terminated (e.g., with a terminator character "'").

Database systems often store data in a tabular form, in which each row corresponds to one record, and each column is associated with a distinct field, which may be empty if that field is optional in a record. If there are many possible but optional fields, many of the columns of a record may be empty (e.g., Null). Efficient indexing approach are available for such database systems, for example, forming an index for one or more columns permitting retrieval of records that satisfy a condition (e.g., a query) based on values in the columns of the table.

SUMMARY

In a general aspect, an approach to structured record retrieval permits transmission and storage of records in a native concise format, without requiring that the records be interpreted and stored in a tabular form. Such storage of the records in a tabular form (e.g., in a "flat" or relational database) might double the space required, and more generally, requires substantially more space in applications in which there are many optional elements. In some embodiments, each message comprises a structured record that is parsed according to a specification of the message structure (e.g., according to a "grammar" for the message), and during parsing field values in predefined positions in the structure are extracted and added to an index structure that associates record identifiers with the (position, value) pairs. In some examples, each (position, value) pair is used as a key that is associated with a bit vector in which records having that value at the specified position have corresponding bits set. Retrieval of records with a specified value in a particular position uses a retrieved bit vector to identify and access the original records stored in the native format. Retrieval of records that satisfy a Boolean query for values in specified fields may use a Boolean combination of bit vectors associated with different parts (e.g., terms) of the Boolean query prior to identification and access of the records satisfying the query.

In one aspect, in general, a method is directed to locating records in a data store storing a plurality of structured records (or messages comprising such structured records). The plurality of structured records stored in the data store is accessed. At least some records of the plurality of structured records that are accessed each includes a plurality of segments of the respective record, and each segment of the plurality of segments of the respective record has a position (e.g., a context location) in a nested hierarchy of segments. At least some segments of the plurality of segments of the record are associated with one or more corresponding values. The plurality of structured records are indexed. This indexing includes forming an index data structure associating records of the plurality of structured records with a plurality of keys. Each key includes a value corresponding to a segment and a position of the segment in the nested hierarchy of segments. Each key in the index is associated with a corresponding indicator that associates the key with associated records. In the index data structure, each record, of at least some of the plurality of structured records, is associated with corresponding one or more keys. The associating of a first record with a first key includes parsing the first record to identify a first value corresponding to a first segment of the first record and corresponding to a first position of the first segment in the nested hierarchy of segments, and updating a particular indicator in the index data structure associated with the first key that includes the first value and the first position. A query is processed to retrieve records of the plurality of structured records that match the query using the index data structure. The processing includes processing the query to determine a set of one of more keys that includes at least a first key. The first key includes a first query value and a first query position. An indicator of a subset of the plurality of structured records that match the query is determined. The determining of the indicator includes retrieving a first indicator from the index data structure based on the first key and determining the indicator of the plurality of structured records based on the first indicator. The subset of the plurality of structured records from the data store is retrieved (or caused to be retrieved) according to the indicator.

Aspects may include one or more of the following features.

Accessing the structured records includes receiving the structured records from the data store, and the indexing of the structured records is performed without maintaining copy of the data store after indexing. For example, the records do not have to be ingested into a local flat or relational database for the purpose of indexing and retrieval. An advantage of this approach is that no permanent or long-term copy of the structured records needs to be maintained for the purpose of indexing and retrieval other than the data store from with the structured records are received. This may be an advantage because less storage is required, and there may be reduced possibility of having inconsistencies between a local copy and the data store.

Accessing the structured records includes receiving the structured records, and storing the structured records in a format of the received records or in a compressed format. The indexing of the structured records does not require forming a tabular representation of the data store. An advantage of feature is that the storage of the structured records is at least as compact as the form in which they are received.

The nested hierarchy of segments is represented using a grammar of segments, for example, using a phrase-structured grammar and/or a BNF grammar.

Parsing the first record includes using the grammar to identify the first position according to a nesting of segments within the first record.

Each distinct position of a segment in a nested hierarchy of segments is represented by a different number.

Each indicator associated with a corresponding key and includes a bit vector representation of one or more records of the plurality of records associated with the key.

For each key of the plurality of keys, the position in the nested hierarchy is represented as a path in the nested hierarchy. Alternatively, the position in the nested hierarchy is represented as a numerical identifier. Alternatively, the position in the nested hierarchy is represented as a tuple.

The query further includes a second key that includes a second query value and a second query position, and determining the indicator of the plurality of structured records further includes retrieving a second indicator from the index data structure based on the second key. The determining of the indicator of the subset of the plurality of records is further based on the second indicator.

The query defines a Boolean combination of terms, including a first term associated with the first key and a second term associated with the second key, and wherein determining the subset of the plurality of records is based on a Boolean combination of the first indicator and the second indicator (e.g., as a bitwise Boolean combination of bit vector indicators).

At least some segments of records are associated with more than one corresponding value, each value having a different offset in the segment, and the query further includes an offset representing an offset within a plurality of values associated with a segment.

The offset identifies a component of the segment.

The offset further identifies a value within the segment.

The offset identifies the component as a numerical reference to an enumeration of components of the segment, and the offset identifies the value within the segment as a numerical reference to an enumeration of values in the component.

In another aspect, in general, software stored in a non-transitory form on a computer-readable medium includes instructions for causing a computing system to perform all the steps of any one of the methods set forth above.

In another aspect, in general, a computing system for locating records of a plurality of structured records in a data store that match a query is configured to perform all the steps of any one of the methods set forth above.

In yet another aspect, in general, a data structure is stored on a non-transitory machine-readable medium. This data structure includes a representation of a nested hierarchy of segments associated with a data store holding a plurality of structured records, at least some records of the plurality of structured records each including a plurality of segments of the record. The data structure further includes an index data structure associating records of the plurality of structured records with a plurality of keys, each key including a value corresponding to a segment and a position in the nested hierarchy associated with the data store, each key being associated with a corresponding indicator associating the key with records associated with the key. The data structure may be used to impart functionality to a system for data retrieval from the data store.

In yet another aspect, in general, a system for data retrieval for a computer memory includes a means for configuring said memory according to a representation of nested hierarchy of segments and an index data structure. The representation of the nested hierarchy of segments is associated with a data store holding a plurality of structured records, at least some records of the plurality of structured records each including a plurality of segments of the record. The index data structure associates records of the plurality of structured records with a plurality of keys, each key including a value corresponding to a segment and a position in the nested hierarchy associated with the data store, each key being associated with a corresponding indicator associating the key with records associated with the key.

Aspects can include one or more of the following advantages.

The formation of an index based on positional context of values provides a time and space efficient approach to identification of records for retrieval without requiring storing a database of records in a conventional tabular form. Without conversion to tabular form, compact storage of the data is maintained while nevertheless providing time-efficient query execution to identify desired records. The pre-computation of the index, which is then used for processing queries, may in at least some embodiments be updated as records are added to a data store without having to rebuild the index structure.

Other features and advantages of the invention will become apparent from the following description, and from the claims.

DESCRIPTION OF DRAWINGS

FIG. 7 is and illustration of part of an EDIFACT-based grammar.

DESCRIPTION

Figure 1:
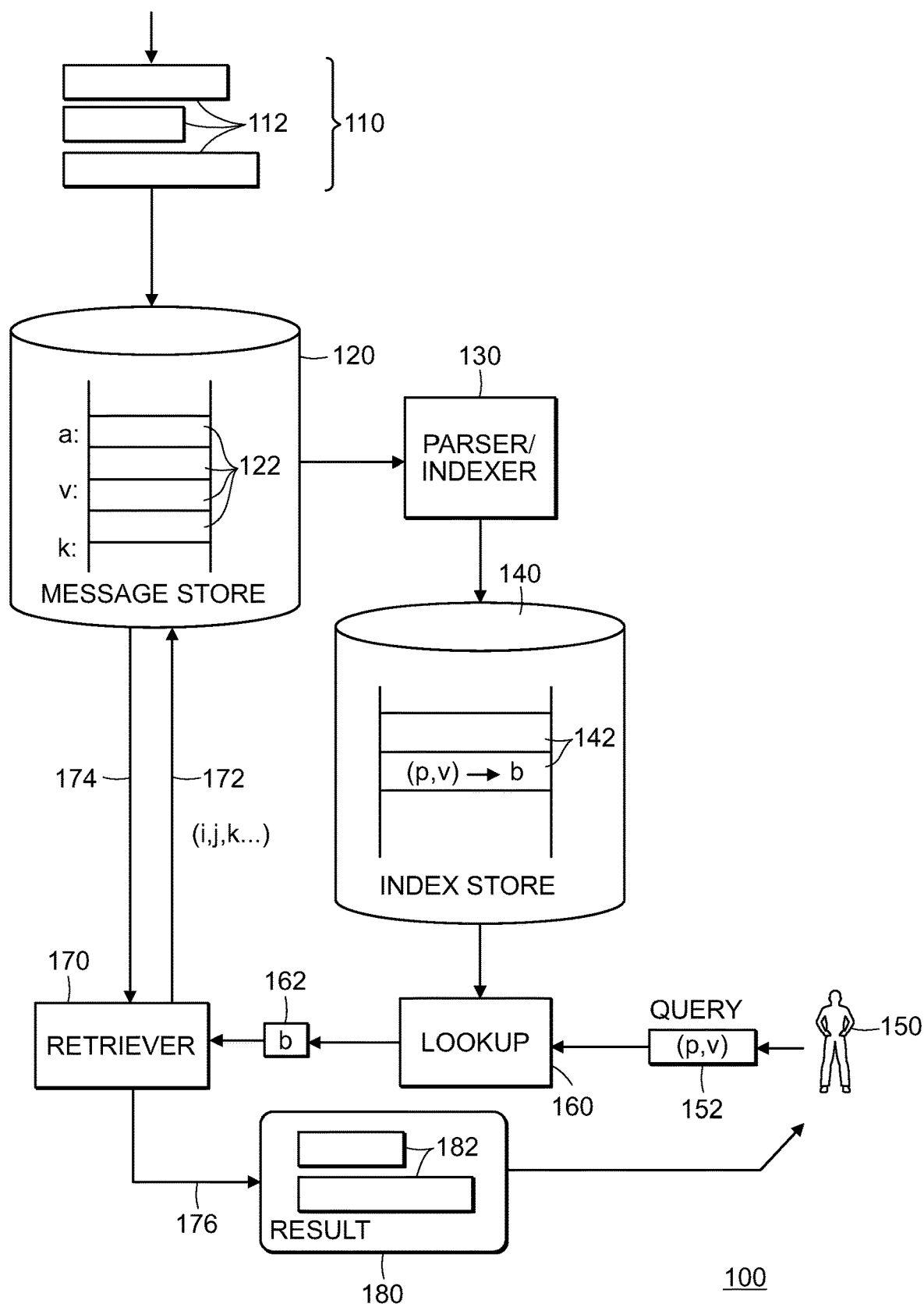
FIG. 1 is a storage and retrieval system.

Referring to FIG. 1, storage and retrieval system 100 includes a message store 120, which is used to store messages 112 (collectively input messages 110). For example, the message store may include a centralized or distributed electronic data storage facility in which the messages 112 is kept. Each message comprises a structured record. In the discussion below, the message store 120 may also be referred to as a data store, which stores the structure records corresponding to the messages. In some examples, the message store receives messages from multiple sources over data communication links (e.g., over a computer network), and keeps a copy of each message for access by data processing systems. Generally, one function of the system 100 is to provide a user 150 (or equivalently an automated data processing system) with an ability to request any messages in the store 120 that satisfy a content-based query and to identify and access those messages from the store 120 for the user, for example to provide the messages as a response to the user.

Without being limited to any particular application, in one example, the messages 112 are in the form of EDIFACT messages. According to the EDIFACT standard (ISO 9735 (1988)), each message may have a variable size, both in the number of bytes or characters used to represent it as well as in the number of basic data elements (e.g., numbers, characters, strings) that are represented in each message. The data messages have a hierarchical syntax in which more than one basic data element may be combined within a section of the message, and these sections may themselves be nested. In the specific context of EDIFACT messages, these sections may be referred to as segments, and the basic data elements can form composites of multiple elements, and collections of segments may form groups, which themselves may be included in the hierarchical structure of a message.

As a more particular application, again without intended to be limited to this application, the approach is applied to flight travel information processing, for instance including airline reservation processing. In this context, each trip associated with a particular individual traveling at a particular time on a particular airplane will in general be associated with multiple messages. For example, the same trip may have a message associated with the booking, another message associated with a meal request, another message associated with boarding of the passenger on the plane, and so forth. Various functions in the travel information processing may require various types of queries, both by individuals (e.g., travel agents) and automated systems (e.g., a Web-based application providing information access to a traveler), as well as data processing systems (e.g., payment processing systems, travel rewards programs, etc.) that may periodically need to access the messages.

Returning to FIG. 1, the messages 112 are stored as records 122 in the store 120. These records have the same format as the input messages, or alternatively have a format that is a direct translation of the messages, which may reduce the size, for example, through compression of the messages. In any case, in general, elements (e.g., basic values) of records are not at fixed locations within the messages, as they might be in a row and column tabular arrangement.

As introduced above, the input messages can have a variety of content, with a variety of hierarchical structure. As a result, elements of the messages can occur in many different contexts. For example, there may be hundreds, thousands, or more different contexts. If a tabular arrangement was used in which each context was associated with a different column of the table, a result would be that most entries in the table would be unused (i.e., null or empty) because any particular record has elements from only a relatively small number of contexts.

Notwithstanding the format of the stored records 122, the system 100 provides an indexed-based data access capability. In order to support this capability, the system 100 includes an index store 140, which generally stores index information associated with the messages stored in the message store 120.

The system indexes the messages of the data store using a parser/indexer 130, which scans each message 112 as it arrives at (or on the communication path to) the message store 120, or alternatively, scans each record 122 corresponding to each input message after it arrives at the store 120, and updates index data in the index store 140. The index store 140 provides a mapping between keys, each representing a unique (position, value) pair, and representation of a set of messages that match that key.

In operation, generally after having formed the index store 140, a user 150 provides a query 152, which is passed to a lookup component 160. The lookup component accesses the index data in the index store 140 to determine a representation of the records (e.g., a list or a bit vector) that match the query. This or an equivalent representation is passed to a retriever 170, which passes requests 172 to the message store 120 and in return receives the corresponding messages 174 from the message store. The retriever 170 provides these messages to the user 150, for example, bundled as a result 180, which includes the messages satisfying the query 150 in the same format as the messages 112. Alternatively, the retriever sends the messages to the user as they become available, or in yet another alternative, instructs the message store to send the requested messages directly to the user.

The index data in the index store 140 is arranged in a set of records 142. Each record is associated with a key comprising a "position" of an element, and a value of the element (i.e., a value pair), and has a representation of locations of records 122 that have the specified value in the specified position in the message. The position of an element uniquely identifies both the type of element, as well as the particular hierarchical context within the set of possible messages for the application for which the system is being used. For example, in a travel information processing application, some messages have a section associated with a reservation. Within such a section for a reservation, some reservations have a section associated with a passenger, and some reservations may have a section associated with a travel agent. A section for a passenger may have contain a section for an address, which may in turn have a section for a street address, for example "1 Main Street." A section for a travel agent may also have a section for an address, which may also have a section for a street address, for example, "1 Commercial Way." In this simplified example, the structure of an address section may be the same regardless of whether it is part of a passenger section or a travel agent section. However, the address in the reservation-passenger-address context has a different "position" than the address in reservation-agent-address context. As described below, all the possible context of elements that may be queried are assigned unique identifiers (e.g., integers) that are determined from the specification of valid message structures for the application. For example, an address for the reservation-passenger-address context may be assigned a position value 158 while an address for the reservation-agent-address context may be assigned a position value 247. These values may be assigned in a variety of ways, for example, sequentially in an enumeration of the set of contexts for which index entries are desired, or alternatively, based on a hash function approach in which the context is transformed to an integer through a function that generally provides unique numbers for different input contexts.

A variety of types of representations of locations of records 122 can be used. In one implementation, which provides a compact storage, the representation is a bit vector in which index records that are associated with a corresponding (position, value) key have a bit vector with one bit set for each matching record with that bit set in a position associated with the location of the record 122 in the message store. For example, if message at record 1003 matches the position and value, the $1003^{rd}$ bit of the bit vector for that index record 142 is set. In some embodiments, the bit vector is compressed, for example, with a run-length coding approach in which runs of zeroes are compressed into a count of the length of the run, or as another example, using an ordered list of the positions that correspond to set bits. In any case, in various embodiments, the index store 140 includes a data structure that provides an efficient mapping from a (position, value) key (e.g., position=175, value="1 Main St.") to a representation of records in which that value occurs in a record at a position (i.e., context) that was assigned identifier 175.

Figure 2:
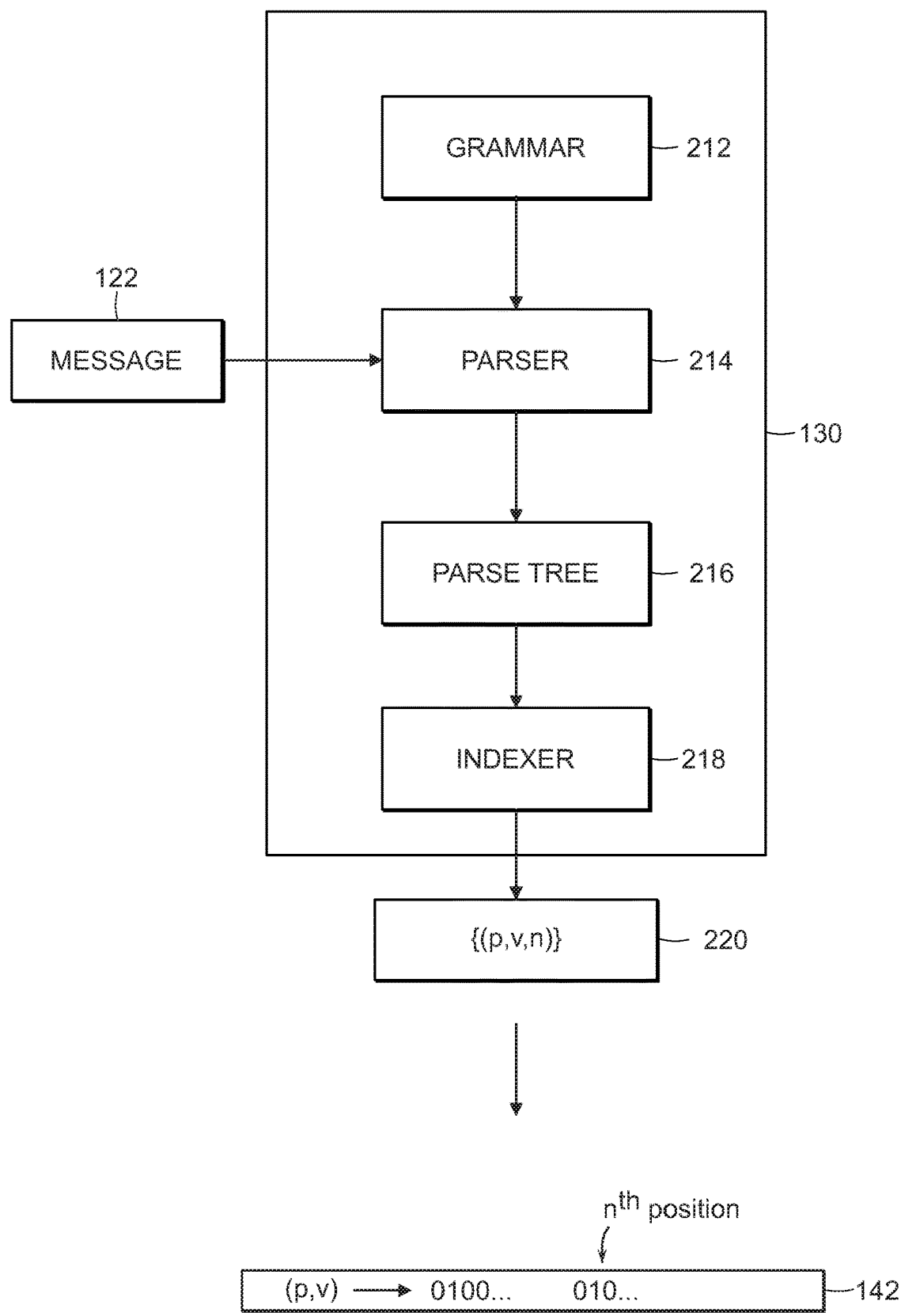
FIG. 2 is a block diagram illustrating a parser/indexer of FIG. 1.

Referring to FIG. 2, an implementation of a parser/indexer 130 (introduced in FIG. 1) makes use of a grammar 212 for the messages. Generally, the grammar serves a function of defining the set of allowable messages, and in particular, defines the set of allowable nestings of segments, groups, composites, and basic elements that are represented in messages. In some examples, this grammar may be represented as a phrase-structured grammar in which transformations (e.g., "rewrites") of parts of a message (e.g., non-terminal portions, named segments, etc.) may be expressed as possible sequences of non-terminals, segments, elements etc. For example, such a grammar may be expressed in a form analogous to a Backus-Naur Form (BNF). The messages for a particular application may form sequences within a variety of classes of grammars, including context-free and context-dependent languages. However, it should be understood that the approaches described herein are not limited to any particular form of grammar or message "language".

A second function of the grammar is to associate the position of each element in an analysis (i.e., a parse) of a message with the position index of that element in the space of possible parses of all messages. In general, there is only a single complete parse of the message, so the process of parsing is deterministic, and each element in the messages is associated with only a single possible phrase context of the grammar. For example, parts of the grammar may be tagged with the position indices, or there may be a separate table (e.g., an enumeration or a hash table) that matches the context of an element with the position index. As introduced above, this means that an element that is a street address in the context of passenger information in the context of a reservation message will have the same position index, regardless of whether there is other information in the message, and will have a different position index than that same element in different context.

Continuing to refer to FIG. 2, the grammar 212 imparts functionality on a parser 214 in the sense that parser 214 may be general to messages for many different applications, for example, for many different applications that use an EDIFACT format, but the grammar 212 imparts the specific functionality required to process any particular message 122 for the application from which the grammar 212 is specified. Generally, as discussed further below in the context of illustrative examples, the parser 214 produces what may be considered to be a parse tree 416, which identifies the constituents of the message and their nesting within one another, and the parts of the message (or the value of that part) correspond to each of the constituents (or at least the terminal constituents that do not have further nesting within them, and therefore are the basic elements of the message). As introduced above, the constituents are associated with their globally unique position indices, which may have been encoded in the grammar 212, or may be determined after the parse three is constructed based on the nested contexts of the constituents of the message. In the latter case, for each constituent to be indexed, the context of that constituent may be looked up in a table of the grammar, which maps that context to a position index.

The output of the parser 216 is processed by an indexer 218, which combines the values of parts of the message (e.g., the terminal elements), at least for those parts to be indexed, with their position indices and the message index (e.g., a sequence number) to form tuples (p,v,n), where p is the position index, v is the value of the part of the message associated with the constituent, and n is the index of the message. The indexer then uses this tuple to update the index record 142 for each of these constitutes, for example, in the case of a bit vector representation, by setting the $n^{th}$ bit in the bit vector associated with the (p, v) pair.

Figure 3:
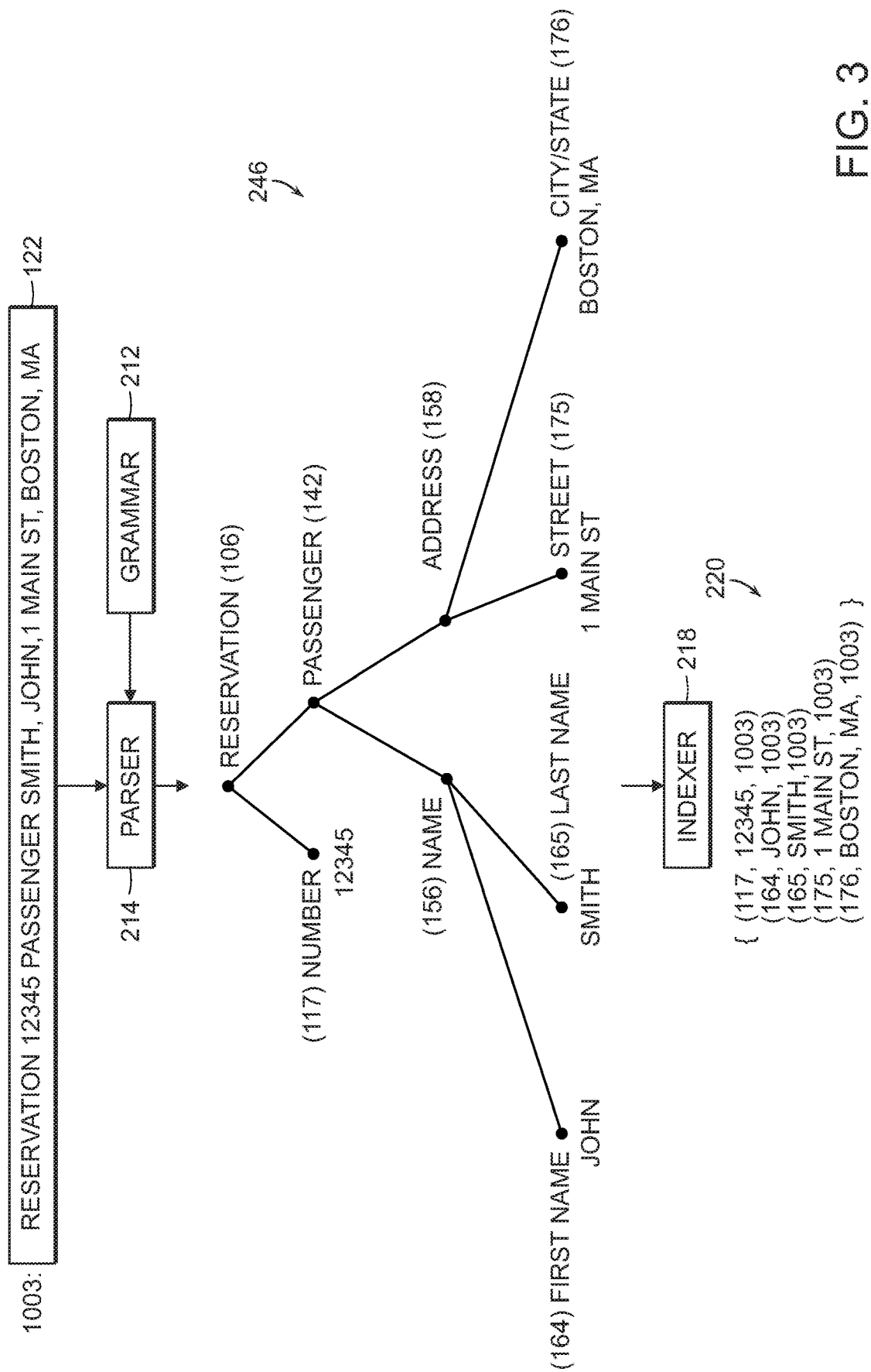
FIG. 3 is a first illustrative example of message processing.

Referring to FIG. 3, in a first illustrative example, a message 122 has an index n=1003 (e.g., it is the $1003^{rd}$ message received), and has an overall content "Reservation 12345, passenger Smith, John, 1 Main St., Boston Mass.". This illustration does not use the EDIFACT format, but it should be understood that an analogous example using that format would follow the same or similar processing steps. In this example, the parser 214, using the grammar 212 for this application, produces a parse tree 216, which may be illustrated as shown in FIG. 3. That is, the parse of the message has a top-level constituent of a "reservation," which has two parts: a reservation number, which is a basic element, and passenger information part. The passenger information part in turn has a name part and an address part, the name part has a first name part and a last name part, and the address part has a street address part and a city-state part. In this illustration, each part is annotated (in parentheses) with the position index of that part. For example, the reservation number is annotated with a part index 117, which is universally assigned to "number" in the context of a top-level "reservation" regardless of the particular message that context may occur in.

Various implementations of the parser 214 may be used. For example, a bottom-up parser (e.g., a deterministic parser for instance an LR (Left-Right) parser, or a chart of CYK (Cocke-Younger-Kasami) parser) may be used.

In this illustration, the indexer 218 generates a set of (p, v, n) tuples 220. For example, for the reservation number, the tuple is (117, 12345, 1003) meaning that the value 12345 occurs in the position 117 in message number 1003. Additional such tuples are shown in FIG. 3.

Figure 4:
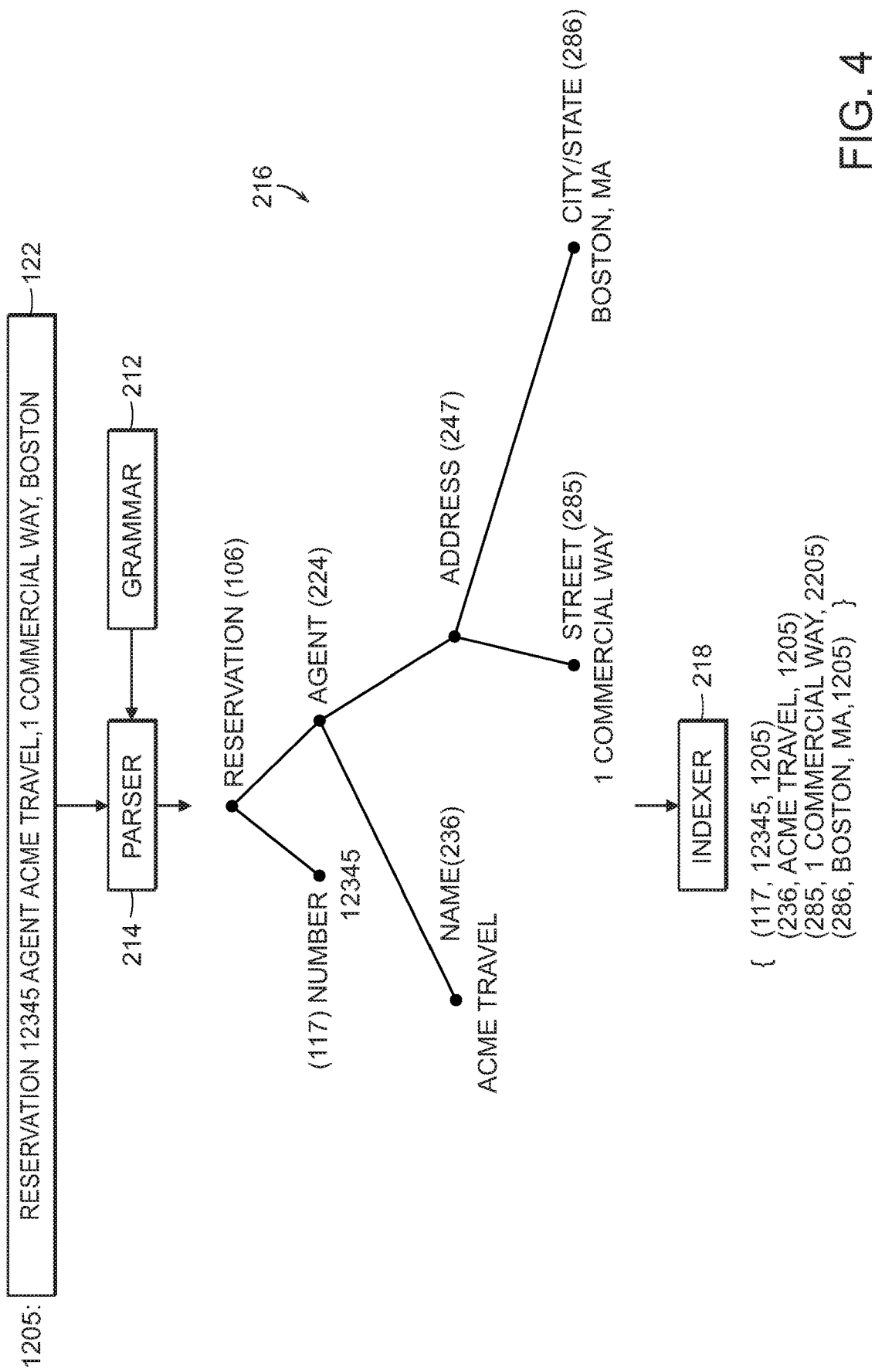
FIG. 4 is a second illustrative example of message processing.

Referring to FIG. 4, in a second illustrative example of a message 122 with a message index 1205 also relates to a reservation, and has some elements in common with the message illustrated in FIG. 3. In this message, the reservation part has a number element (in this example, the same reservation number as in FIG. 3), and rather than a passenger part the message has an agent part. The parser 214 uses the grammar 212 to form the parse tree 216 (or an equivalent data structure), including the position indices of the constituents of the message. The indexer 218 processes the parse tree to form the (p,v,n) tuples as discussed previously with reference to FIG. 3.

In this example, the reservation number is again at position 117. That is, the context for the number within a top-level reservation is the same context as in the message of FIG. 3, and therefore the position number is the same. The tuple for this number is (117, 12345, 1205). On the other hand, the street part of the address, with a value "1 Commercial Way" is at a position index 285 corresponding to a street part, within an address, within an agent part, within a reservation. This is in contrast to the street part "1 Main St." in FIG. 3, which is at a position 175 corresponding to a street part, within an address, within a passenger part, within a reservation. As illustrated, the indexer 218 generates a set of (p, v, n) tuples.

Figure 5:
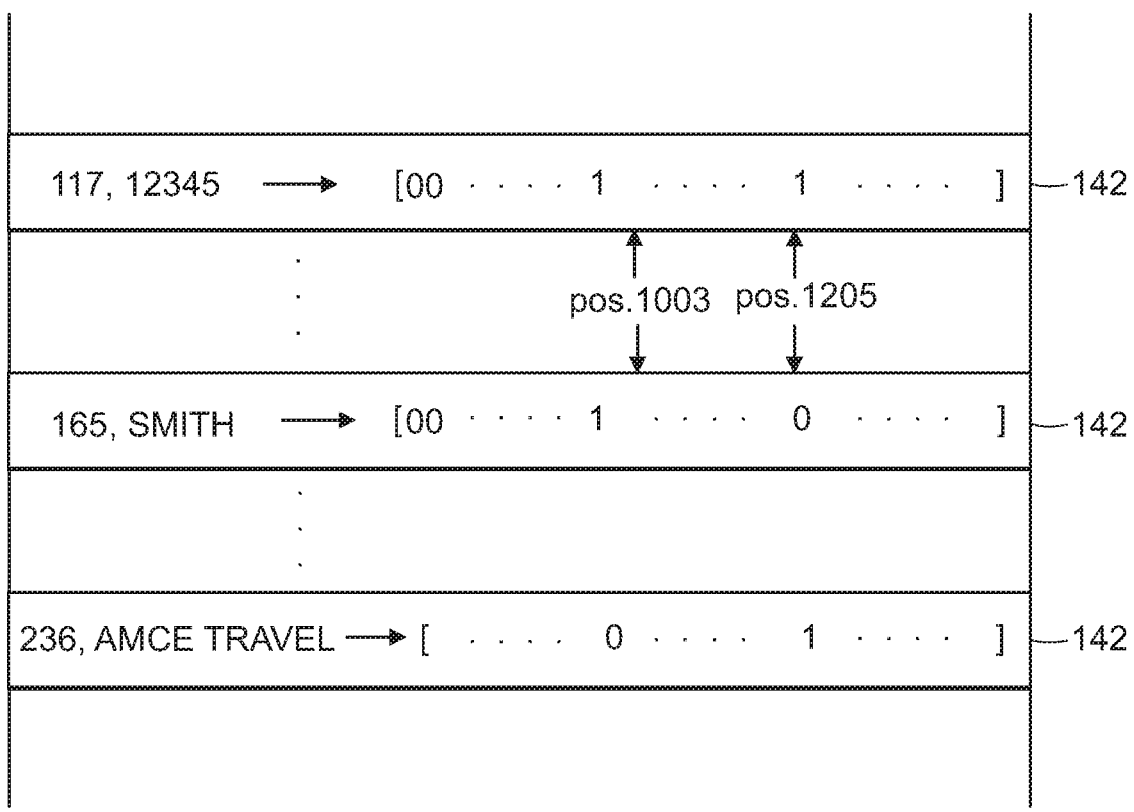
FIG. 5 is an illustration of an index store after processing the messages of FIGS. 3 and 4.

Referring to FIG. 5, and as introduced above, the index store 140 includes multiple records 142, each associated with a position value (p, v) pair. The (p, v, n) tuples are stored in the index store 140 by setting the bit for each message number n to 1 if the index store has received the tuple (p, v, n) from the indexer. As illustrated, the (117, 12345) record (i.e., for any reservation number 12345) has at least bits 1003 and 1205 set, corresponding to the examples shown in FIGS. 3 and 4. Similarly, the (165, "Smith") record, corresponding to a last name of a passenger in a reservation segment, has bit 1003 set (corresponding to FIG. 3) but does not have bit 1205 set (corresponding to FIG. 4, where there is no passenger part). Similarly, the (236, "Acme Travel") has bit 1205 set but not bit 1003.

As introduced above, the procedure illustrated in FIGS. 2-5 may be performed as messages arrive at the message store 120, or may be performed in batches, for example, for all messages added in an hour, or a day etc. In any case, at any time, some or all of the messages in the message store 120 have been indexed and are represented (if they do have indexable fields) in the index store 140. Note that in the discussion above, all elements are indexed. However, it may be preferable to limit indexing to only a subset of the elements or a subset of the positions. For example, perhaps the reservation number is indexed, but the street address is not. Although such a choice may limit the efficiency of a query involving a street address, such a choice may provide an appropriate space-time tradeoff. As an alternative to searching for a particular street address (e.g., "1 Main St.") using an index, and alternative is to parse each record 122 in the message store to locate those records that have the desired value in the street address.

Figure 6:
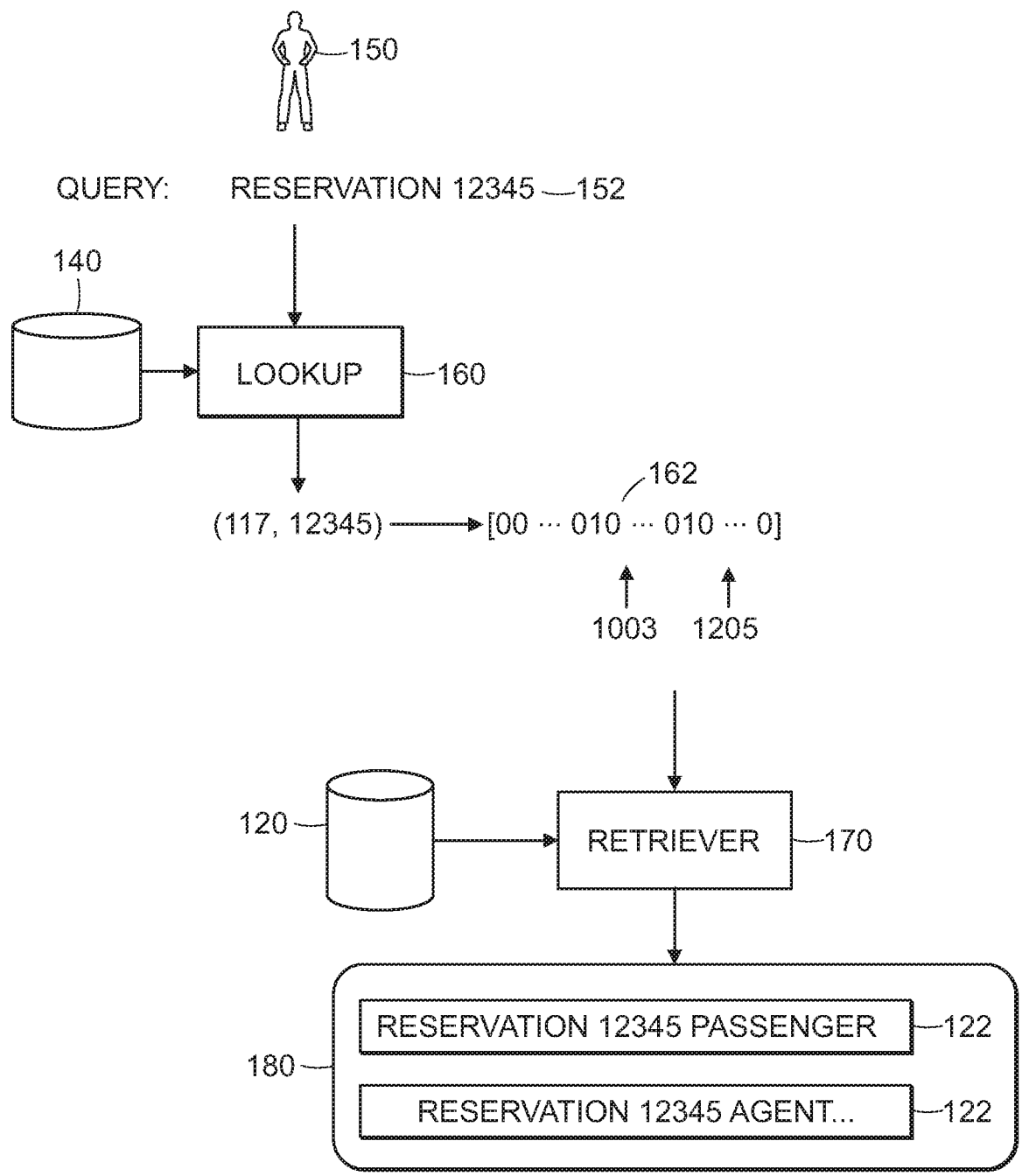
FIG. 6 is an illustrative example of a query processing.

Referring to FIG. 6, in an example of a query process based on the value of a single position (element in a particular context), a user 150 issues a query, for example, for all messages for reservation number 12345. The lookup component 160 accesses the index store 140 to identify the message records 122 that match such a query. To do so, the position of the number element is first determined, in this case mapping number in the context of reservation to position 117. In order to make such a mapping, the lookup 160 has access to data consistent with the grammar 212 of the parser/indexer 120 (e.g., by direct access to the same data used by the parser, or to a different but consistent data structure). Having determined that the position-value (p, v) pair of interest is (117, 12345), the lookup accesses the corresponding bit vector 162, which has bits 1003 and 1205 set. This bit vector (or a data structure with equivalent information) is sent to the retriever 170, which requests records 1003 and 1205 from the message store 120, receives those corresponding records, and bundles them into a response 180 for the user.

Not illustrated in FIG. 6 is a case for a more complex Boolean query. For such a Boolean query, the lookup accesses the bit vector for each term of the query, and then performs a bitwise Boolean operation to yield the combined bit vector corresponding to the messages that satisfy the Boolean query.

In some implementations, the query process may be parallelized. For example, in the case of a Boolean query, records 142 for different terms in the query may be accessed in parallel. This may be made more efficient by partitioning the records 142 into separate data section for example based on a position, thereby avoiding data contention for the parallel lookups. Another option for parallelism is in pipelining the communication of the bit vectors from the index store or the combination of the bits according to the Boolean expression, with requests for records from the message store. For example, to the extent that the bottleneck is the access to the message store 120 itself, such pipelining may provide best overall retrieval speed possible.

The discussion above has limited reference to the specifics of EDIFACT message structure. Based on the description of EDIFACT message format provided above, it should be evident that EDIFACT segments, groups, and composites may play the role of constituents within a parse tree (i.e., non-terminals of the grammar) while the basic elements may form the leaves of the parse trees (i.e., the terminals of the grammar) and are assigned the position indices. In another alternative, composites are also assigned position indices, and a position index is represented as a pair consisting of the position in the parse tree for the composite, and an index of the element within the composite (e.g., the $2^{nd}$ element of the composite at position 137).

The EDIFACT structured records are somewhat more complex than the illustrative examples of FIGS. 3-4. In particular, a basic element in a message is, in general found within a particular nesting of EDIFACT segments, and within that segment, found at a certain sequential position of elements within that segment, and if that position is a composite element, at a certain sequential position of basic elements within that composite element. Rather than representing a "position" as a single enumerated (e.g., integer) quantity as in the examples of FIGS. 3-4, in the EDIFACT-specific implementation, the position itself is represented as a tuple p=(sp, ep, bp), where sp is an enumerated quantity that is distinct for each possible nesting of segments in the possible message of the application domain, ep is an index of the basic or composite element (e.g., zero-origin such that 0 is the first element, 1 is the second element, etc.). If the element is with a composite element at index ep in the segment, then bp is the index of the element within that composite element. If the element is not within a composite element, then the element is a basic element at index ep in the segment, and bp is arbitrarily set to 0.

Note that replacing the simple integer position p in the previous examples, with a tuple representation of p=(sp, ep, bp) does not alter the approach described above because what is important is that each possible context of a basic element has a distinct value of the position, but there is no fundamental necessity that the position be a scalar quantity. Another aspect of this EDIFACT-specific implementation is that only the contexts of segments are enumerated, while the contexts of groups of segments are not assigned because a group of segments does not directly contact elements.

Referring now to FIG. 7, an illustrative example of the grammar in a particular EDIFACT application is represented as a listing of possible nesting of segments, and their basic and composite elements. Note that the grammar of FIG. 7 depicts all the elements that may be present in a valid message in the application, whereas the examples of FIGS. 3-4 are particular messages. The grammar shown in FIG. 7 is a tree representation, with a root node for the "Reservation" group of segments. A "Reservation" group of segments may contain (i.e., directly nested within it) a "Passenger" group of segments or an "Agent" group of segments, or both, as well as other groups of segments or segments not illustrated in FIG. 7, which illustrates only a small portion of the grammar. The "Passenger" group of segments may contain a "Name" segment (named "TIF") and/or an "Address" segment (named "ADR"). A "Name" segment within a "Passenger" group within a "Reservation" group is assigned the segment position sp=1, while the "Address" segment within a "Passenger" group within a "Reservation" group is assigned the segment position sp=2.

A "Name" segment has a "Traveler Surname and Related Information" component at index ep=0 in the "Name" segment. This component has a "Family name" element at index bp=0. Therefore, a name such as "Smith" as a "Family name" element within a "Traveler Surname and Related Information" component, within a "Name" segment within a "Passenger" group within a "Reservation" group has a "position" within the grammar of p=(sp,ep,bp)=(1,0,0). Therefore, if the "Name" of "Smith" occurs in a message number 1003, then the indexer produces a record of the form ((1,0,0), "Smith", 1003) and the index record accessed by ((1,0,0), "Smith") (or equivalently (1,0,0,"Smith")) has the $1003^{rd}$ bit set.

In a similar manner, an "Address component description" element is at index 1 in and "Address Details" component, which is the second element (index 1) in the "Address" segment in the "Passenger" group in the "Reservation" group, and therefore has a position p=(2, 1, 1). Also in the same manner, an "Address component description" element is at index 1 in and "Address Details" component, which is the second element (index 1) in the "Address" segment in the "Agent" group in the "Reservation" group, and therefore has a position p=(3, 1, 1), because the "Address" segment in the "Passenger" group in the "Reservation" group has segment context sp=3.

Although only three segment contexts are illustrated in the part of the grammar shown in FIG. 7, in this example application with EDIFACT record structures there are over 10,000 different segment contexts that can occur, and therefore FIG. 7 is a very small part of the overall grammar.

It should be recognized that the index structure described above for the index store 140 is only one implementation example. Other structures, for example, balanced trees, may be used rather than (p, v) addressed bit vectors. The particular choice of the index structure depends, in part, on the infrastructure in place for the processing of a query including, for example, the possible parallelism and pipelining for the query processing. For example, in the context of a parallel graph-based processing infrastructure (e.g., using a distributed dataflow computing architecture) the (p,v) access to records and bit vector storage may be particularly amendable to parallelization according to a hash of the position, and pipelining of the processing of records indicated in a bit vector representation. On the other hand, in a single-processor (i.e. serial processing) case, an alternative structure such as a balanced tree for each position may be most effective.

The approaches described above may be implemented, for example, using a programmable computing system executing suitable software instructions or it can be implemented in suitable hardware such as a field-programmable gate array (FPGA) or in some hybrid form. For example, in a programmed approach the software may include procedures in one or more computer programs that execute on one or more programmed or programmable computing system (which may be of various architectures such as distributed, client/server, or grid) each including at least one processor, at least one data storage system (including volatile and/or non-volatile memory and/or storage elements), at least one user interface (for receiving input using at least one input device or port, and for providing output using at least one output device or port). The software may include one or more modules of a larger program, for example, that provides services related to the design, configuration, and execution of dataflow graphs. The modules of the program (e.g., elements of a dataflow graph) can be implemented as data structures or other organized data conforming to a data model stored in a data repository.

The software may be stored in non-transitory form, such as being embodied in a volatile or non-volatile storage medium, or any other non-transitory medium, using a physical property of the medium (e.g., surface pits and lands, magnetic domains, or electrical charge) for a period of time (e.g., the time between refresh periods of a dynamic memory device such as a dynamic RAM). In preparation for loading the instructions, the software may be provided on a tangible, non-transitory medium, such as a CD-ROM or other computer-readable medium (e.g., readable by a general or special purpose computing system or device), or may be delivered (e.g., encoded in a propagated signal) over a communication medium of a network to a tangible, non-transitory medium of a computing system where it is executed. Some or all of the processing may be performed on a special purpose computer, or using special-purpose hardware, such as coprocessors or field-programmable gate arrays (FPGAs) or dedicated, application-specific integrated circuits (ASICs). The processing may be implemented in a distributed manner in which different parts of the computation specified by the software are performed by different computing elements. Each such computer program is preferably stored on or downloaded to a computer-readable storage medium (e.g., solid state memory or media, or magnetic or optical media) of a storage device accessible by a general or special purpose programmable computer, for configuring and operating the computer when the storage device medium is read by the computer to perform the processing described herein. The inventive system may also be considered to be implemented as a tangible, non-transitory medium, configured with a computer program, where the medium so configured causes a computer to operate in a specific and predefined manner to perform one or more of the processing steps described herein.

The instructions may be at different levels, including machine-language instructions, virtual machine instructions, higher-level programming instructions, and/or compiled or interpreted instructions. In some implementations, certain of the functions may be implemented fully or partially in special-purpose hardware. For example, various queues shown in FIG. 2 may have dedicated hardware, which may increase the efficiency or reduce the latency of the queuing approach that is implemented. Some implementations use a combination of software and special-purpose hardware components.

A number of embodiments of the invention have been described. Nevertheless, it is to be understood that the foregoing description is intended to illustrate and not to limit the scope of the invention, which is defined by the scope of the following claims. Accordingly, other embodiments are also within the scope of the following claims. For example, various modifications may be made without departing from the scope of the invention. Additionally, some of the steps described above may be order independent, and thus can be performed in an order different from that described.

What is claimed is:

1. A method for locating records in a data store for a plurality of structured records, the method including:

accessing the plurality of structured records stored in the data store, the structured records conforming to a specification defining a set of allowable records and a predefined nested hierarchy of segments, the specification including respective identifiers of distinct nested contexts in the predefined nested hierarchy of segments;

wherein at least some records of the plurality of structured records each include a plurality of segments of the respective record, each segment of the plurality of segments of the respective record having a context in the predefined nested hierarchy of segments, and at least some segments of the plurality of segments of the respective record being associated with one or more corresponding values;

indexing the plurality of structured records, the indexing including:

forming an index data structure, the index data structure associating records of the plurality of structured records with a plurality of keys, each key including a value corresponding to a segment and an identifier of a context of the segment in the nested hierarchy of segments, and each key being linked via the index data structure with a corresponding indicator that associates the key with associated records;

associating, in the index data structure, each record, of at least some of the plurality of structured records, with corresponding one or more keys, where associating a first record with a first key includes parsing the first record to identify a first value corresponding to a first segment of the first record and corresponding to a first context of the first segment in the nested hierarchy of segments, and updating a particular indicator in the index data structure linked via the index data structure with the first key that includes the first value and the identifier of the first context to identify the first record;

processing a query to retrieve records of the plurality of structured records that match the query using the index data structure, the processing including:

processing the query including determining a set of one or more keys that includes at least a first key that identifies a first query context specifying a query segment and a nesting of the query segment within other segments of the predefined nested hierarchy of segments and includes a first query value;

determining an indicator of the plurality of structured records that match the query, including retrieving a first indicator from the index data structure based on the first key and determining the indicator of the plurality of structured records based on the first indicator; and retrieving a subset of the plurality of structured records from the data store according to the indicator.

2. The method of claim 1 wherein accessing the structured records includes receiving the structured records from the data store, and indexing the structured records is performed without maintaining a copy of the data store after indexing.

3. The method of claim 1 wherein accessing the structured records includes receiving the structured records, and storing the structured records in a format of the received records or in a compressed format the data store, and the indexing of the structured records does not require forming a tabular representation of the data store.

4. The method of claim 1 wherein the nested hierarchy of segments is represented using a grammar of segments, and wherein parsing the first record includes using the grammar to identify the first context according to a nesting of segments within the first record.

5. The method of claim 1 wherein each distinct context of a segment in a nested hierarchy of segments is represented by a different number.

6. The method of claim 1 wherein each indicator is associated with a corresponding key and includes a bit vector representation of one or more records of the plurality of records associated with the key.

7. The method of claim 1 wherein for each key of the plurality of keys, the context in the nested hierarchy is represented as a path in the nested hierarchy.

8. The method of claim 1 wherein for each key of the plurality of keys, the context in the nested hierarchy is represented as a numerical identifier.

9. The method of claim 1 wherein the set of one or more keys includes a second key that includes a second query value and a second query context, and wherein determining the indicator of the plurality of structured records further includes retrieving a second indicator from the index data structure based on the second key, the determining the indicator of the subset of the plurality of records is further based on the second indicator.

10. The method of claim 9 wherein the query defines a Boolean combination of terms, including a first term associated with the first key and a second term associated with the second key, and wherein determining the indicator of the subset of the plurality of records is based on a Boolean combination of the first indicator and the second indicator.

11. The method of claim 1 wherein at least some segments of records are associated with more than one corresponding value, each value having a different offset in the segment, and the query further includes an offset representing an offset within a plurality of values associated with a segment.

12. The method of claim 11 wherein the offset identifies a component of the segment.

13. The method of claim 12 wherein the offset further identifies a value within the segment.

14. The method of claim 13 wherein the offset identifies the component as a numerical reference to an enumeration of components of the segment, and the offset identifies the value within the segment as a numerical reference to an enumeration of values in the component.

15. The method of claim 4 wherein each distinct context of a segment in a nested hierarchy of segments is represented by a different number.

16. The method claim 15 wherein each indicator is associated with a corresponding key and includes a bit vector representation of one or more records of the plurality of records associated with the key.

17. The method of claim 16 wherein at least some segments of records are associated with more than one corresponding value, each value having a different offset in the segment, and the query further includes an offset representing an offset within a plurality of values associated with a segment.

18. The method of claim 4 wherein for each key of the plurality of keys, the context in the nested hierarchy is represented as a path in the nested hierarchy.

19. A non-transitory computer-readable medium comprising software stored thereon, the software including instructions for causing a computing system to perform operations including:
- accessing a plurality of structured records stored in a data store,
the structured records conforming to a specification defining a set of allowable records and a predefined nested hierarchy of segments, the specification including respective identifiers of distinct nested contexts in the predefined nested hierarchy of segments;
- wherein at least some records of the plurality of structured records each include a plurality of segments of the respective record, each segment of the plurality of segments of the respective record having a context in the predefined nested hierarchy of segments, and at least some segments of the plurality of segments of the respective record being associated with one or more corresponding values;
- indexing the plurality of structured records, the indexing including:
  - forming an index data structure, the index data structure associating records of the plurality of structured records with a plurality of keys, each key including a value corresponding to a segment and an identifier of a context of the segment in the nested hierarchy of segments, and each key being linked via the index data structure with a corresponding indicator that associates the key with associated records;
  - associating, in the index data structure, each record, of at least some of the plurality of structured records, with corresponding one or more keys, where associating a first record with a first key includes parsing the first record to identify a first value corresponding to a first segment of the first record and corresponding to a first context of the first segment in the nested hierarchy of segments, and updating a particular indicator in the index data structure linked via the index data structure with the first key that includes the first value and the identifier of the first context to identify the first record;
- processing a query to retrieve records of the plurality of structured records that match the query using the index data structure, the processing including:
  - processing the query including determining a set of one or more keys that includes at least a first key that identifies a first query context specifying a query segment and a nesting of the query segment within other segments of the predefined nested hierarchy of segments and includes a first query value;
  - determining an indicator of the plurality of structured records that match the query, including retrieving a first indicator from the index data structure based on the first key and determining the indicator of the plurality of structured records based on the first indicator; and
  - retrieving a subset of the plurality of structured records from the data store according to the indicator.

20. A computing system for locating records of a plurality of structured records in a data store that match a query, the system comprising:
- means for accessing a plurality of structured records stored in a data store, the structured records conforming to a specification defining a set of allowable records and a predefined nested hierarchy of segments, the specification including respective identifiers of distinct nested contexts in the predefined nested hierarchy of segments,
- wherein at least some records of the plurality of structured records each include a plurality of segments of the respective record, each segment of the plurality of segments of the respective record having a context in the predefined nested hierarchy of segments, and at least some segments of the plurality of segments of the respective record being associated with one or more corresponding values;
- means for indexing the plurality of structured records, the indexing including:
  - forming an index data structure, the index data structure associating records of the plurality of structured records with a plurality of keys, each key including a value corresponding to a segment and an identifier of a context of the segment in the nested hierarchy of segments, and each key being linked via the index data structure with a corresponding indicator that associates the key with associated records;
  - associating, in the index data structure, each record, of at least some of the plurality of structured records, with corresponding one or more keys, where associating a first record with a first key includes parsing the first record to identify a first value corresponding to a first segment of the first record and corresponding to a first context of the first segment in the nested hierarchy of segments, and updating a particular indicator in the index data structure linked via the index data structure with the first key that includes the first value and the identifier of the first context to identify the first record;
- means for processing a query to retrieve records of the plurality of structured records that match the query using the index data structure, the processing including:
  - processing the query including determining a set of one or more keys that includes at least a first key that represents a first query context specifying a query segment and a nesting of the query segment within other segments of the predefined nested hierarchy of segments and includes a first query value;
  - determining an indicator of the plurality of structured records that match the query, including retrieving a first indicator from the index data structure based on the first key and determining the indicator of the plurality of structured records based on the first indicator; and
  - retrieving a subset of the plurality of structured records from the data store according to the indicator.

\* \* \* \* \*